United States Patent
Tanaka et al.

(10) Patent No.: US 12,408,026 B2
(45) Date of Patent: Sep. 2, 2025

(54) MESSAGE COMMUNICATION DEVICE AND MESSAGE COMMUNICATION PROGRAM

(71) Applicant: ACCRETE, INC., Tokyo (JP)

(72) Inventors: Yusei Tanaka, Tokyo (JP); Keiichi Kamikawa, Tokyo (JP)

(73) Assignee: ACCRETE, INC., Tokyo (JP)

(*) Notice: Subject to any disclaimer, the term of this patent is extended or adjusted under 35 U.S.C. 154(b) by 738 days.

(21) Appl. No.: 17/611,535

(22) PCT Filed: May 14, 2020

(86) PCT No.: PCT/JP2020/019346
§ 371 (c)(1),
(2) Date: May 26, 2022

(87) PCT Pub. No.: WO2020/230868
PCT Pub. Date: Nov. 19, 2020

(65) Prior Publication Data
US 2022/0345880 A1    Oct. 27, 2022

(30) Foreign Application Priority Data
May 16, 2019 (JP) .................... 2019-093072

(51) Int. Cl.
*H04W 8/26* (2009.01)
*H04W 4/14* (2009.01)

(52) U.S. Cl.
CPC .............. *H04W 8/26* (2013.01); *H04W 4/14* (2013.01)

(58) Field of Classification Search
CPC .................................. H04W 8/26; H04W 4/14
See application file for complete search history.

(56) References Cited

U.S. PATENT DOCUMENTS 10,212,104 B1 *  2/2019  Bhatt ................... H04L 51/02
2007/0168429 A1   7/2007  Apfel et al.
(Continued)

FOREIGN PATENT DOCUMENTS

| CN | 101107819 A | 1/2008 |
| CN | 101351788 A | 1/2009 |

(Continued)

*Primary Examiner* — Diane D Mizrahi
(74) *Attorney, Agent, or Firm* — Fitch, Even, Tabin & Flannery LLP

(57) ABSTRACT

The disclosed techniques provide a message communication device comprising: a memory that stores program instructions; and a processor that is configured to execute the program instructions stored in the memory to: accept at least an address and one or more messages to be transmitted to the address from a client, and the messages each possibly including a text; select one communications provider device; select one communication protocol; output a message that complies with the selected communication protocol and is to be transmitted to the address, from the one or more messages; and request the selected communications provider device to transmit the message such that the message that has been outputted is transmitted to the address by the selected communications provider device using the selected communication protocol, and repeat the request until the transmission is successful or there are no more combinations of the communications provider device and the communication protocol.

10 Claims, 7 Drawing Sheets

(56) References Cited

U.S. PATENT DOCUMENTS

| | | |
|---|---|---|
| 2008/0268817 A1 | 10/2008 | Anderl et al. |
| 2009/0075680 A1 | 3/2009 | Carroll |
| 2015/0188858 A1 | 7/2015 | Nagata et al. |
| 2016/0286027 A1 | 9/2016 | Lee et al. |

FOREIGN PATENT DOCUMENTS

| | | |
|---|---|---|
| CN | 101543105 A | 9/2009 |
| CN | 104350480 A | 2/2015 |
| JP | 2007-274524 A | 10/2007 |
| JP | 2009-522641 A | 6/2009 |
| JP | 2011-527467 A | 10/2011 |
| JP | 2012-178799 A | 9/2012 |
| JP | 2015-177346 A | 10/2015 |
| JP | 2016-001491 A | 1/2016 |
| JP | 2018-046530 A | 3/2018 |
| WO | 2007078464 A1 | 7/2007 |
| WO | 2010/002354 A1 | 1/2010 |

\* cited by examiner

MESSAGE COMMUNICATION DEVICE AND MESSAGE COMMUNICATION PROGRAM

CROSS-REFERENCE TO RELATED APPLICATIONS

This application is a U.S. national phase application filed under 35 U.S.C. § 371 of International Application No. PCT/JP2020/019346, filed May 14, 2020, designating the United States, which claims benefit from Japanese Application No. 2019-093072, filed May 16, 2019, the entire contents of each of which are incorporated herein by reference.

TECHNICAL FIELD

The present invention relates to a message communication device and a computer-readable medium storing a message communication program.

BACKGROUND ART

There are various configurations in techniques to transmit messages to communication terminals. Message communication techniques include one that uses a normal mail address as a destination, one that uses a telephone number or an address associated with the telephone number as a destination, and the like. Note that in the Specification, the message refers to a message that possibly contains a text.

The address associated with the telephone number includes addresses as follows. For example, a mail address given by a communication carrier that manages a cellular telephone number in association with the telephone number is one of them. This mail address is a mail address given uniquely in association with the telephone number. Or the address associated with the telephone number may be an address used in a messaging system that accompanies an SNS account uniquely associated with a cellular telephone number. Alternatively, the address associated with the telephone number may be a communication address that has a high ability to identify an individual such as one associated with a telephone number. Hereinafter, in the Specification, such an address is referred to as a "telephone number or an address associated with the telephone number".

When these message communications are compared, the message communication that uses a normal mail address as a destination is a simple message transmission method with low communication costs. That is, in the message communication that uses a normal mail address as a destination, by designating a mail address as a destination, it is possible to transmit a message regardless of whether it is domestic or overseas. It is also possible to transmit a message independently from the type of the carrier of the cellular telephone or the like.

In contrast, the message communication that uses a telephone number or an address associated with the telephone number as a destination has characteristics such as a high arrival probability to the destination, a high message opening rate, a high ability to specify a communications partner, and the like. However, in the message communication that uses a telephone number or an address associated with the telephone number as a destination, there is also a case where a message fails to reach due to a difference in communication method and the like. With the characteristics of these message communications taken into account, the message communication that uses a normal mail address as a destination and the message communication that uses a telephone number or an address associated with the telephone number as a destination are used separately as appropriated depending on the needs of uses, the content of a message to be transmitted, and the like.

In these days, a plurality of configurations exist as shown below for the message communication that uses a telephone number or an address associated with the telephone number as a destination due to the diversification of communication carriers and the diversification of communications providers (telecommunications service providers). In addition, the types, formats, communication protocols, and the like of contents that can be transmitted are different depending on these communication configurations.

Examples of the configurations of the message communication that use a telephone number or an address associated with the telephone number as a destination are shown below.

An example of the message communication that uses a telephone number or an address associated with the telephone number as a destination is SMS (Short Messaging Service). SMS is capable of transferring character strings using a telephone number as a destination but is incapable of transmitting multimedia contents containing still images, moving images, and the like.

Another example is MMS (Multimedia Messaging Service). MMS is capable of transmitting multimedia contents containing images, sounds, videos, and rich texts.

Another example is RCS (Rich Communication Services). RCS is capable of transmitting multimedia contents containing texts, moving images, positional information, files, and the like using a telephone number as a destination.

Other examples of the message communication that uses a telephone number or an address associated with the telephone number as a destination include a communication configuration in which the user uses a dedicated application installed in a communication terminal and a communication configuration in which the user uses a dedicated user interface by logging in a predetermined website using a WEB browser.

When these communication configurations are classified in terms of the usage of communications, there are message communications from a communication terminal to a communication terminal (so-called P2P (Person to Person)) and simultaneous deliveries from a company to communication terminals of individuals (so-called message delivery from an application on the company side: A2P (Application to Person)).

In the case of the message communication that uses a telephone number or an address associated with the telephone number as a destination, there is a large difference in usage between P2P and A2P unlike the communication configuration that uses a mail address.

In the communication of P2P that uses a telephone number or an address associated with the telephone number as a destination, an individual who uses a communication terminal transmits a message to a partner using a user interface corresponding to the type of the message communication used, and accordingly it is normal that no event of transmitting a message of a specification that cannot be transmitted to the partner in the first place occurs. In addition, when a message that goes through a communications provider (communication carrier) that does not allow the message to be transmitted to a partner is attempted to be transmitted, it is normal that the destination of the partner cannot be selected in the first place.

In contrast, the message communication in A2P that uses a telephone number or an address associated with the telephone number as a destination is set in an environment different from the above-described message communication in P2P. For example, in the case where a certain company attempts to transmit a message to a large number of telephone numbers or addresses corresponding to the telephone numbers, it is often the case that the configurations of the usable message communication are not clear in advance, which requires the company to deal with different situations depending on the transmission destinations. In the case where a company (client) handles the message communication of A2P that delivers a message to the communication terminals of individuals (users), there has been difficulty in which message communication configuration should be selected from among a plurality of message communication configurations while the communication configurations are being diversified.

There are conventional techniques regarding message communications that use a telephone number or an address associated with the telephone number as a destination as described below, for example.

There is a technique including: a carrier information acquisition step of determining a transmission destination carrier network b to which a reception terminal belongs based on a telephone number of transmission destination of the reception terminal and acquiring other carrier information containing information on the protocol of the transmission destination carrier network b from a carrier information database; and a protocol conversion and transmission step of protocol-converting an SMS mail based on the other carrier information in accordance with the protocol of the carrier network b of the transmission destination and transmitting the converted SMS mail (see for example Patent Literature 1).

In addition, there is a technique of a data intermediate system including: a transmission source terminal that transmits request data to a partner portable terminal; a management device that is connected to the transmission source terminal via a public line or a wide area network and receives the request data; and a plurality of gateway devices that are connected to the management device and provide short message service (SMS) allowing connection to the partner portable terminal, wherein the management device selects one gateway device from among the plurality of gateway devices and requests the selected gateway device to perform processing corresponding to the request data received from the transmission source terminal, the data intermediate system comprising protocol conversion for transmitting data in accordance with API of the gateway device; and response data converting means (see for example Patent Literature 2).

In addition, there is a technique using a short message service gateway system, including: short message service (SMS) serves c installed in respective carriers; and a server computer that is connected to a provider server installed in a provider for providing a service that enables a consumer terminal to communicate short messages with cellular telephone terminals of the respective carriers. There is a technique that performs a first protocol conversion process of converting SMS using a carrier protocol unique to each carrier which is transmitted from the cellular telephone terminal of each carrier into SMS using a provider protocol; and a second protocol conversion process of specifying a carrier that is to be a transmission destination of SMS transmitted from the consumer terminal and converting the SMS of the provider protocol into a carrier protocol used in the specified carrier (see for example Patent Literature 3).

However, the above-described conventional techniques only provide solutions on the premise that a message can be transmitted to a telephone number or an address associated with the telephone number, and are not sufficiently applicable to an environment where configurations of message communication that use diversified telephone numbers or addresses associated with the telephone numbers as destinations in these days.

CITATION LIST

Patent Literature

[Patent Literature 1] Japanese Patent Application Publication No. 2007-274524
[Patent Literature 2] Japanese Patent Application Publication No. 2012-178799
[Patent Literature 3] Japanese Patent Application Publication No. 2016-1491

SUMMARY OF INVENTION

Technical Problem

The present invention has been made in order to deal with such problems, and has an object to provide message communication that complies with communication environments of a client and a user of the client in an environment where various communication configurations related to communications of messages each possibly including a text are present and that is more convenient for the client and the users of the client.

Solution to Problem

A disclosed technique provides a message communication device comprising: an accepting unit that accepts at least an address and one or more messages to be transmitted to the address from a client, the address being a telephone number of a user of the client or an address associated with the telephone number, and the messages each possibly including a text; a communications provider device selecting unit that selects one communications provider device from among a plurality of communications provider devices; a communication protocol selecting unit that selects one communication protocol from among a plurality of communication protocols used in the plurality of communications provider devices; a message output unit that outputs a message that complies with the selected communication protocol and is to be transmitted to the address, from the one or more messages; and a transmission request unit that requests the selected communications provider device to transmit the message such that the message that has been outputted is transmitted to the address by the selected communications provider device using the selected communication protocol, the transmission request unit repeating the request until the transmission is successful or there are no more combinations of the communications provider device and the communication protocol.

In addition, another disclosed technique provides a message communication device comprising: an accepting unit that accepts at least an address and one or more messages to be transmitted to the address from a client, the address being a telephone number of a user of the client or an address associated with the telephone number, and the messages each possibly including a text; a communications provider device selecting unit that selects one communications provider device from among a plurality of communications provider devices; a communication protocol selecting unit that selects one communication protocol from among a plurality of communication protocols used in the plurality of communications provider devices; a message output unit that outputs a message that complies with the selected communication protocol and is to be transmitted to the address, from the one or more messages; a transmission request unit that requests the selected communications provider device to transmit the message such that the message that has been outputted is transmitted to the address by the selected communications provider device using the selected communication protocol; a determination unit that determines whether or not the transmission is successful; and a record control unit that controls recording of the communications provider device and the communication protocol as well as the address when the determination unit determines that the transmission is successful, into a log in association with one another, wherein in a case where the log is searched for the address and the address is hit, the communications provider device selecting unit selects the communications provider device corresponding to the hit address with priority, and the communication protocol selecting unit selects the communication protocol corresponding to the hit address with priority.

Advantageous Effects of Invention

The disclosed techniques make it possible to provide message communication that complies with communication environments of a client and a user of the client in an environment where various communication configurations related to communications of messages each possibly including a text are present and that is more convenient for the client and the user of the client.

DESCRIPTION OF EMBODIMENTS

In message communication in A2P that uses a telephone number or an address associated with the telephone number as a destination, in order to enhance the message arrival probability in the message communication from a company (client) to each of communication terminals of individuals (users), it has been demanded to appropriately select in which configuration to conduct the message communication in accordance with the environment where each individual communication terminal is situated. In addition, there may presumably be a case where a plurality of configurations for transmitting messages to one communication terminal exist. For these reasons, it is demanded that it is possible to select different configurations of message communication in accordance with the needs of a company (client) or an individual (user) who transmits a message and the content of the message. For example, there is a case where which one of configurations of message communication is appropriately used is different depending on an application installed and used in the communication terminal of a user.

Hereinafter, an embodiment disclosed herein will be described.

Figure 1:
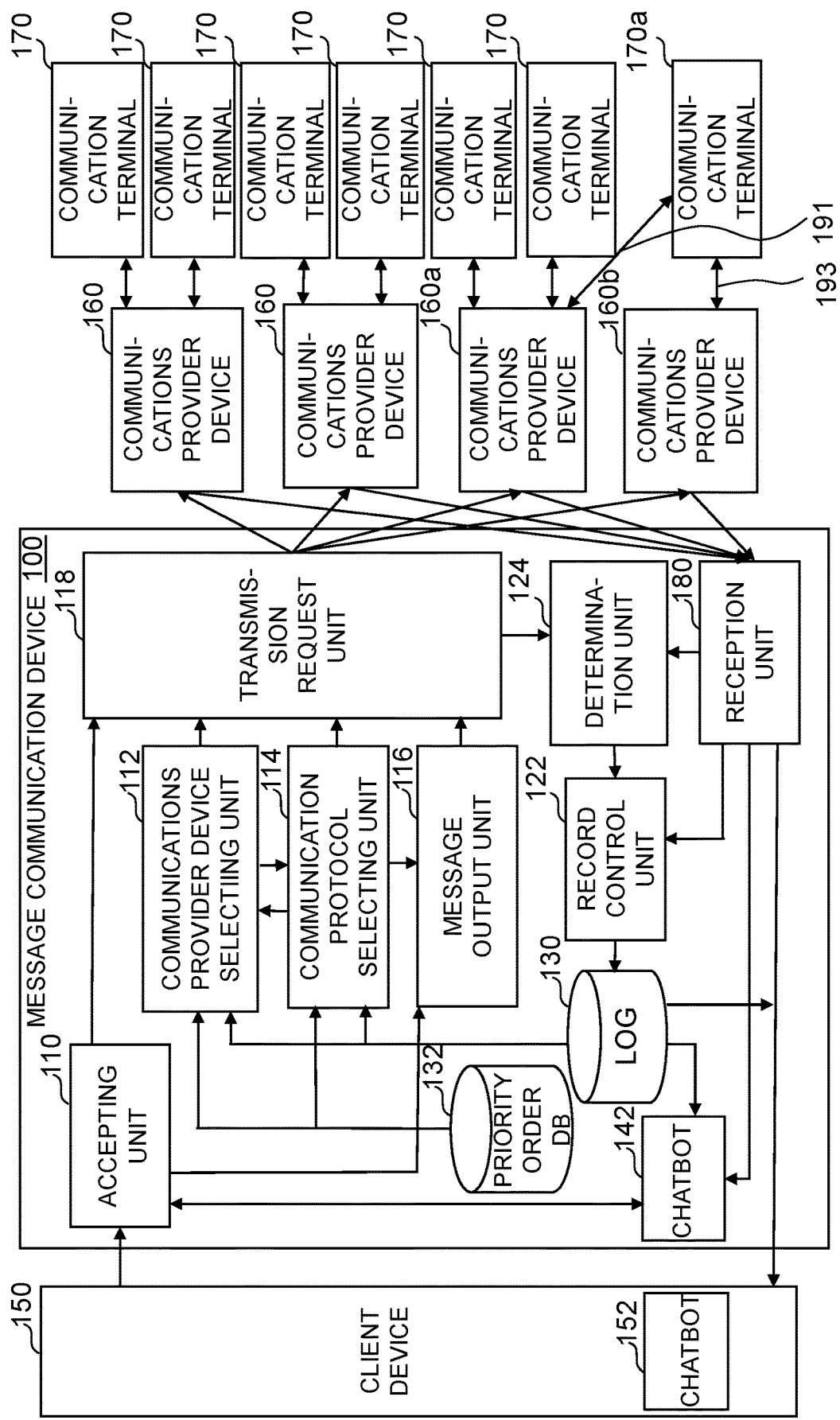
FIG. 1 is a block diagram illustrating the entire configuration of one embodiment.

FIG. 1 is a block diagram illustrating the configuration of one embodiment. This embodiment is achieved by a message communication device 100.

<Communications Provider>

In the Specification, the term "communications provider" is used. The carrier (MNO (Mobile Network Operator)) in mobile communications is an example of the communications provider. MVNO (Mobile Virtual Network Operator), which uses the communication line of this carrier, is also an example of the communications provider. Besides, companies that run messaging services provided in association with SNS (Social Networking Service) and the like and companies that provide communication terminals and OS and run messaging services as a function of the OS are also examples of the communications provider.

As illustrated in FIG. 1, this embodiment involves a client device 150, a plurality of communications provider devices 160, the message communication device 100 which intermediate message communication between the client device 150 and the plurality of communications provider devices 160, and communication terminals 170 which are managed by users. Who manages the communication terminals 170 is referred to as a user.

Each of the plurality of communications provider devices 160 is connected to a communication network (not shown) that achieves message communications with the communication terminals 170.

The message communication device 100 accepts one or more messages to be transmitted, telephone numbers or addresses associated with the telephone numbers, which serve as destinations, and the like, from the client device 150. The messages from client device 150 are transmitted to the communication terminals 170 of the users via the message communication device 100 and the communications provider devices 160.

<Destinations of Messages>

The message communication device 100 accepts a message to be transmitted to each of the plurality of communication terminals 170 managed by the users and a telephone number of the transmission destination or an address associated with the telephone number from the client device 150 managed by the client.

The message communication device 100 transmits a message that complies with a selected communication protocol and the telephone number or an address associated with the telephone number to the communications provider device 160. Note that the message that complies with a selected communication protocol is selected or generated from the accepted one or more messages.

The message communication device 100 requests the communications provider device 160 to transmit the message to the communication terminal 170 corresponding to the telephone number or an address associated with the telephone number.

Note that the above-described one or more messages include, for example, a first message composed of a text having a predetermined number of characters or less for the SMS communication protocol and a second message composed of a rich text containing an image or the like for the RCS communication protocol.

The message communication device 100 accepts, for example, a first message and a second message as well as a plurality of telephone numbers or addresses associated with the telephone numbers from this client device 150. The message communication device 100 requests the communications provider devices 160 to transmit the first message to a first telephone number among the plurality of telephone numbers using the SMS communication protocol. Or the message communication device 100 requests the communications provider device 160 to transmit the second message to the same first telephone number using the RCS communication protocol. In this way, the message communication device 100 selects a message that complies with the communication protocol. Note that in the case where none of the one or more messages accepted by the message communication device 100 comply with a predetermined communication protocol, the message communication device 100 may generate a message that complies with the predetermined communication protocol from the one or more messages by using a predetermined algorithm. The predetermined algorithm is desirably designated by the client device 150 in advance.

In addition, the message communication device 100 may receive a return message, a notification of arrival, a notification of opening, and the like from the communication terminals 170 through the communications provider devices 160 and transfer them to the client device 150.

The connection between the message communication device 100 and the communications provider device 160 is desirably a direct connection using API that is determined by each communications provider.

Using the configuration illustrated in FIG. 1 makes it possible to perform message communication between the client device 150 under the management of the client and the communication terminals 170 of a plurality of users via the message communication device 100. Note that in this embodiment, a combination of the communications provider device 160 and a communication protocol directed to the telephone numbers of the communication terminals 170 or addresses associated with the telephone numbers is desirably used so as to transmit a message having a high arrival probability to the destination, a high message opening rate, and a high ability to specify a communications partner. Or the combination of the communications provider device 160 and a communication protocol may be selected with another evaluation standard (low communication cost or the like) taken into consideration.

<Message>

The message to be transferred is a message that possibly contains characters. That is, the message may be a so-called rich text, which can contain an image, a sound, a file, and the like other than characters. The message may be a message containing only an image or a file but containing no text.

In addition, the message communication may be not only a unidirectional message communication which is transmitted from the client device 150 to the communication terminals 170 but also a bidirectional message communication between the client device 150 and the communication terminals 170. As described later, a chatbot 142 may automatically return a response message in response to the message from the communication terminal 170.

The operation of the message communication device 100 will be described in further detail with reference to FIG. 1.

<Method for Transmitting Message>

An accepting unit 110 accepts one or more messages and a telephone number or an address associated with the telephone number to which the one or more messages should be transmitted, from the client device 150.

The one or more messages mean a collection of messages to be transmitted to telephone numbers or addresses associated with the telephone numbers as already illustrated. For example, in the case where messages are transmitted to the communication terminals 170 using the SMS communication protocol, messages composed of only a predetermined number of characters or less are prepared as the messages. In addition, in the case where messages are transmitted to the communication terminals 170 using the RCS communication protocol, messages that are not limited to only a text but composed of a so-called rich text containing a text, an image, and the like are prepared as the messages. If the client knows in advance that messages to be transmitted to all the telephone numbers or addresses associated with the telephone numbers are transmitted using a single predetermined communication protocol, the messages that the accepting unit 110 accepts from the client device may be a single message (or a single predetermined format) that complies with the single predetermined communication protocol. However, a plurality of communication protocols for transmitting messages such as SMS and RCS exist. Hence, in reality there is a case where it is impossible to specify one communication protocol for messages that can be transmitted to the communication terminals 170 in advance due to the diversification of configurations of message communication. Assumed is a case where the formats of messages are different depending on the respective communication protocols. Hence, messages that the accepting unit 110 accepts from the client device 150 are desirably one or more messages generated in a plurality of types of formats that comply with assumable communication protocols.

Note that, for example, in the case where none of one or more messages that the accepting unit 110 accepts from the client device 150 comply with the selected communication protocol transmitted to the communication terminals 170, the one or more messages may be converted to messages that comply with the communication protocol by the message output unit 116 as described later. For example, assumed is a case where the accepting unit 110 has accepted only one type of rich text messages prepared for RCS and the messages are to be transmitted to the communication terminals 170 using the SMS communication protocol. In this case, the rich text messages are desirably converted into messages of text only by the message output unit 116 such that the rich text complies with the SMS communication protocol. As the method for conversion, the message output unit 116 may extract only the text from the rich text to generate a message for SMS. Or the message output unit 116 may generate, for example, a file in accordance with HTML from the rich text. A message of characters only may be generated such that URL of the generated file is inserted into the message for SMS. It is desirable that what message generation method is used is designated by the client in advance. The message output unit 116 may be configured to generate messages that comply with a communication protocol to be used based on the message generation method designated by the client in advance.

In the case where the accepting unit 110 has accepted a plurality of messages corresponding to the respective communication protocols from the client device 150, the message output unit 116 may output a message that complies with a communication protocol to be used from among the plurality of messages. In the case where the accepting unit 110 has accepted a plurality of messages from the client device 150, it is desirable that the accepting unit 110 also accepts information on to which communication protocol each of the plurality of messages corresponds. Note that even in the case where the accepting unit has accepted a plurality of messages, if none of the plurality of messages comply with the selected communication protocol, the message output unit 116 desirably generates a message that complies with the selected communication protocol from the plurality of messages. In this case as well, the accepting unit 110 desirably accepts the message generation method from the client device in advance. In the case where the message output unit 116 cannot generate a message that complies with a specific communication protocol, the transmission request unit 118 does not have to transmit a request for transmitting messages to the communication terminals 170 using the communication protocol to the communications provider devices 160.

In this way, the accepting unit 110 transmits a message that complies with the selected communication protocol to the transmission request unit 118 in corporation with the message output unit 116 and the like. Note that the operation of the transmission request unit 118 will be described later.

<Identification of User when User Acquires Telephone Number>

In this embodiment, it is on the premise that message communication of which the arrival probability to the destination, the message opening rate, the ability to specify the communications partner, and the like are high is used. Hence, it is on the premise that a general mail address which a user can set or acquire as desired is not used. Note that in the case where a mail address allows message communication of which the arrival probability to the destination, the message opening rate, the communications partner, and the like are high to be secured like a telephone number, the mail address may be used. For example, an example of this includes a mail address that a mobile communication carrier provides to a user in association with a telephone number.

As already mentioned, message communication of which the arrival probability to the destination, the message opening rate, the communications partner, and the like are high includes message communication using a telephone number as a destination. In order for the user to acquire a telephone number, in the case of a cellular telephone, it is necessary for the user to acquire SIM to which the telephone number is allocated. Then, the user needs to pay the usage fee of the communication. For this reason, the user is generally asked to present a document that authenticates the user such as driver's license or passport. In acquisition of prepaid SIM sold in airports and the like as well, in the case of SIM having voice call function, it is general practice that the users need to identify themselves with passport or the like.

Note that in Japan, when users acquire SIM cards dedicated for data communication with SMS function, it is unnecessary for the users to identify themselves. In acquisition of telephone numbers, whether or not the users need to identify themselves varies depending on whether or not the telephone numbers have voice call function. The need to identify themselves also varies depending on whether or not the telephone numbers are telephone numbers of Internet telephones using communication protocols such as SIP.

In addition, whether or not it is required to identify themselves in order to acquire telephone numbers also varies depending on legal systems of countries that allocate the telephone numbers. Note that in most countries, it is possible to confirm whether or not a telephone number has been acquired through the identification of him/herself, by acquiring information disclosed by a government authority or the like of the country that allocated the telephone number.

That is, the degree of credibility of authentication of him/herself varies depending on the telephone number, and that degree can be assumed from disclosed information in most cases. Hence, it is possible to provide a client with information on the level of authentication of him/herself for each telephone number in most cases. In the case where a client wants to know such information, for example, it is possible to record this information in a log 130, which will be described later, and provide the client with the information together with the result of the communication.

<Selection of Communications Provider Devices 160>

Next, selection of the communications provider device 160 in the case where message communication is achieved with the communication terminal 170 corresponding to a telephone number or an address associated with the telephone number will be described.

The initial communications provider (telecommunication carrier) at the time when a telephone number is allocated can be specified by acquiring information disclosed by a government authority or the like which allocated the telephone number. However, when a user uses the MNP (Mobile Number Portability) service, the communications provider (network operator) that manages the telephone number is sometimes changed. In this case, the communication carrier is sometimes the same. Moreover, even in the case where the communications provider is not changed, the communication protocol with which messages can be communicated is also sometimes changed due to the change of the communication terminal, the installation of communication software on the communication terminal, or the deletion of software. In addition, communication terminals that can use messaging communication services such as SNS also exist.

The log 130 desirably stores the communications provider device 160 and communication protocol that were successful in message communication in the past. Note that the log 130 may store either one of the communications provider device 160 or the communication protocol that was successful in message communication in the past. In addition, in the case where current communication fails although the communications provider device 160 and the communication protocol that were successful in message communication in the past are used, it is desirable to delete the corresponding entry or record the fact that the communication has failed in the log 130. It is desirable that the communications provider device selecting unit 112 first searches this log 130 for the telephone number of the destination. Then, in the case where the telephone number or an address associated with the telephone number that were successful in message communication in the past is hit, it is desirable that the communications provider device selecting unit 112 specifies the communications provider device 160 by using the result of the hit, and provide the transmission request unit 118 with information on the communications provider device 160 and the communication protocol. This makes it possible to reduce the frequency of repeating trial and error on the combination of the communications provider device 160 and the communication protocol that will be successful in communication.

The transmission request unit 118 requests the corresponding communications provider device 160 to transmit an applicable message to the communication terminal 170 by addressing the message to the telephone number or an address associated with the telephone number based on information on the communications provider device 160 given by the communications provider device selecting unit 112 and information on the communication protocol given by the communication protocol selecting unit 114. Note that in the case where information on the available communications provider device 160 and information on the applied communication protocol are known in advance based on information of MNP and the like, it is desirable that the record control unit 122 stores this information in the log 130 in advance.

In the case where the address associated with the telephone number is mail address, the transmission request unit 118 may transmit a message using the mail address via the Internet without issuing a transmission request to the communications provider device 160.

The priority order DB 132 may store information on which communications provider device 160 and communication protocol are selected with priority, in accordance with instruction from the client device 150. The usage of the priority order DB 132 includes Patterns described below, for example. Which one of Patterns described below is employed may be instructed to the communications provider device selecting unit 112 from the client device 150 and stored in advance based on the policy of the client.

Note that Patterns described below are examples, and a person skilled in the art can apply Patterns having different variations with reference to Patterns described below.

(Pattern 1) Pattern in which the order of selecting the communications provider device 160 stored in the priority order DB 132 is given priority over the order of selecting the communication protocol, in which the record of the log 130 is ignored, or in the case where all the combinations of communication protocols to be employed in the communications provider device 160 initially selected based on the priority order DB 132 have failed, for example, the record of the log 130 is searched, and if the record is hit, the information of the record is employed.

This Pattern makes it possible to use the most desired communications provider device 160 with priority and to use the log 130 as appropriate, thus effectively reducing the number of times of trial and error.

(Pattern 2) Pattern in which the order of selecting the communication protocol stored in the priority order DB 132 is given priority over the order of selecting the communications provider device 160, in which in the case where the destination is hit in the log 130, if the communication protocol used by the destination thus hit coincides with the selected communication protocol, the communications provider device 160 thus hit is selected with priority irrespective of the order of selecting the communications provider device 160 in the priority order DB 132.

This Pattern makes it possible to effectively reduce the number of times of trial and error in selecting the communications provider device 160 when a desired communication protocol is selected.

(Pattern 3) Pattern in which the content recorded in the log 130 is given priority over information stored in the priority order DB 132, in which if the destination is hit in the log 130, the combination of the communications provider device 160 and the communication protocol used by the destination thus hit is selected with priority, and any one of the following Patterns is employed.

(Pattern 3-1) Pattern in which in the case where there is no hit in the log 130 or communication has failed in the above-described combination, the order of selecting the communications provider device 160 stored in the priority order DB 132 is given priority over the order of selecting the communication protocol.

This pattern makes it possible to effectively reduce the number of times of trial and error because information in the log 130 can be used, and also to give priority to the order of selecting the communications provider device 160.

(Pattern 3-2) Pattern in which in the case where there is no hit in the log 130 or communication has failed in the above-described combination, the order of selecting the communication protocol stored in the priority order DB 132 is given priority over the order of selecting the communications provider device 160.

This pattern makes it possible to effectively reduce the number of times of trial and error because information in the log 130 can be used, and also to give priority to the order of selecting the communication protocol.

A specific example of each of the above-described Patterns is shown below.

Example of Pattern 1

For example, in FIG. 1, there is a possibility that a plurality of communication protocols, that is, communication using a communication protocol 191 of the communications provider device 160a and communication using a communication protocol 193 of the communications provider device 160b, exist for the communication terminal 170a. As such a situation, assumed is a case where the communications provider device 160a supports a messaging communication protocol related to SNS and the communications provider device 160b supports a communication protocol with SMS or RCS, for example.

Then, assumed is a case where the fact that the messaging communication protocol related to SNS that was successful in communication between the communications provider device 160a and the communication terminal 170a in the past is recorded in the log 130, and the configuration in which the communications provider device 160b is selected with priority over the communications provider device 160a and RCS is selected with priority over SMS as the communication protocol is stored in the priority order DB 132.

In this case, the communications provider device selecting unit 112 first selects the communications provider device 160b stored to be given priority in the priority order DB 132 irrespective of the existence of the communications provider device 160a recorded in the log 130. Then, the communication protocol selecting unit 114 selects the RCS communication protocol.

Example of Pattern 2

For example, a case where the client device 150 has instructed that the RCS message communication is desired as given as an example.

In this case, the communications provider device 160 that supports the RCS message communication protocol is given priority. Regarding which communications provider device 160 is selected, if there is hit in the log 130 and the communication protocol of the information thus hit is the RCS communication protocol, the information on the communications provider device 160 hit in the log 130 is given priority. If there is no hit in the log 130, the communications provider device 160 may be selected based on the information on the order of selecting in the priority order DB 132.

Example of Pattern 3-1

If the destination is hit in the log 130, the communications provider device 160 and the communication protocol that were successful in communication to the destination thus hit in the past are selected. In the case where no destination is hit as a result of searching the log 130, the order of selecting the communications provider device 160 stored in the priority order DB 132 is given priority to select the communications provider device 160. Then, for the communications provider device 160 thus selected, the communication protocol is selected in accordance with the order of selecting the communication protocol stored in the priority order DB 132.

Note that the example of Pattern 3-2 is omitted because a person skilled in the art can assume the example from the example of Pattern 3-1.

<Supplementary Note on Communication Protocol Selecting Unit 114>

The communication protocol selecting unit 114 selects a communication protocol for a message that may be communicated by the communications provider device 160. The communication protocol selecting unit 114 transmits the communication protocol thus selected to the transmission request unit 118. The transmission request unit 118 transmits a transmission request containing the message from the message output unit 116 and the communication protocol with which to transmit the message, to the communications provider device 160 selected by the communications provider device selecting unit 112. It is desirable that the transmission request unit 118 and the communications provider device 160 are directly connected using API defined by the respective communications providers.

The communication protocols between the communications provider devices 160 and the communication terminals 170 include, for example, communication protocols for transmitting SMS, MMS, RCS, and the like, unique messaging communication protocols associated with SNS, and the like.

As already mentioned, the communication protocol selecting unit 114 may be configured to select a communication protocol that was successful in transmission in the past, in the log 130. Or the communication protocol selecting unit 114 may select a communication protocol given priority, based on the priority orders stored in the priority order DB 132. Or in the case where the communications provider device 160 has been selected, one of communication protocols that the communications provider device 160 supports is selected. Which communication protocol is given priority may be determined by giving priority to information in the priority order DB 132 or the log 130.

Note that in the case where a certain communications provider device 160 has been selected, any communication protocol that the communications provider device 160 does not support should not be selected. To this end, it is desirable that a correspondence table on communication protocols supported by each of the communications provider devices 160 is stored in the priority order DB 132.

<Control on Record in Log 130>

The record control unit 122 controls information recorded in the log 130.

The determination unit 124 can determine whether or not the transmission of a message has been successful, from information from the transmission request unit 118 and information from the reception unit 180 as to whether the transmission has been successful or failed. The record control unit 122 perform control of recording the combination of the telephone number or an address associated with the telephone number that has been determined to be successful in message communication by the determination unit 124, the communications provider device 160, and the communication protocol, at least into the log 130. Note that in the case where communication has been successful through a plurality of communication paths, the combinations of pluralities of the communications provider devices 160 and communication protocols may be recorded in the log 130 for the same telephone number or an address associated with the telephone number.

Using information in the log 130 makes it possible for the transmission request unit 118 to designate a communication protocol having a high probability of being successful in message communication for the communications provider device 160 having a high probability of being successful in message communication to request for transmitting a message addressed to a telephone number or an address associated with the telephone number.

<Chat>

The chatbot 142 has a function of automatically responding to messages from the communication terminals 170 to achieve correspondence of a plurality of messages with the users of the communication terminals 170 in place of an operator. For example, in message communication such as SMS, MMS, or RCS, the chatbot 142 has a function of chat by corresponding messages. It is desirable to implement AI (not shown) in the chatbot to cause the chatbot to learn chat actually conducted between the operator and the users in advance. The chatbot 142 can chat with the users of the communication terminals 170 in place of the operator using learnt data. The chatbot generates a response message for chat based on information and the like from the accepting unit 110, the reception unit 180, and the log 130 and forwards the generated response message to the accepting unit 110, thus providing the response message to the transmission request unit 118.

Note that the chatbot 152 may be implemented in the client device 150.

<Modification of Message Communication Device 100>

The message communication device 100 can achieve Modifications as described below, for example, based on instruction from the client device 150.

(Modification 1) (Modification that Gives Priority to Message Communication in RCS)

Assumed is a case where the client desires to transmit a rich text containing an image or the like to the communication terminals of a plurality of users using RCS. However, to receive an RCS message, it is necessary that an application that supports RCS has been installed in the communication terminal 170 of the user. In addition, it is on the premise that the communications provider device 160 also supports the RCS communication protocol. Then, the accepting unit 110 accepts the telephone numbers of the plurality of transmission destinations and an SMS message to be transmitted to the communication terminal to which an RCS message failed to be transmitted, in addition to the RCS message from the client device 150.

In the case of this Modification, the communication protocol selecting unit 114 first selects the communication protocol to transfer RCS with priority. For example, assumed is a case where the log 130 has been searched for the telephone number to find that this telephone number is a telephone number that was successful in communication of an SMS message in the past. In this case as well, since selecting the RCS communication protocol with priority is stored in the priority order DB 132, the communication protocol selecting unit 114 selects the RCS communication protocol and forwards the RCS communication protocol to the transmission request unit 118 even when the communication protocol selecting unit 114 has been able to acquire information of the SMS communication protocol from the log 130. If the communications provider device 160 obtained from the log 130 supports RCS, the communications provider device selecting unit 112 selects this communications provider device 160 and forwards the communications provider device 160 to the transmission request unit 118. The message output unit forwards the RCS message to the transmission request unit 118.

The transmission request unit 118 requests the selected communications provider device 160 to transmit the RCS message using the RCS communication protocol. In the case where the communications provider device 160 thus selected successfully transmitted the RCS message, the reception unit 180 receives information that the transmission has been successful. In the case where the communications provider device 160 thus selected failed to transmit the RCS message, the reception unit 180 receives information that the transmission has failed.

In the case where the transmission of the RCS message has been successful, the record control unit 122 records the communications provider device 160 and the RCS message communication protocol into the log 130 in association with the telephone number or an address associated with the telephone number.

In the case where the transmission of the RCS message has failed, if there is an entry in which communication was successful in the past regarding this combination of the communications provider device 160 and the RCS communication protocol with the telephone number or an address associated with the telephone number, the entry is deleted or invalidated. The record control unit 122 may temporarily record the fact that the transmission has failed with the combination of the communications provider device 160 and the RCS message communication protocol into the log in association with the telephone number or an address associated with the telephone number.

Based on this information in the log 130, the communications provider device selecting unit 112 searches the priority order DB 132 to select a different communications provider device 160 to be selected next. The transmission request unit 118 requests the different communications provider device 160 to transmit an RCS message to the same communication terminal 170 using the RCS communication protocol. The transmission request of the RCS message from the transmission request unit 118 is continued until the transmission of the RCS message is successful or there are no more options for the communications provider device 160.

In the case where there are no more options for the communications provider device 160 with the RCS message, for example, SMS is selected as the communication protocol based on the content stored in the priority order DB 132. If there is a record that the message communication with SMS was successful in the log 130, the communications provider device selecting unit 112 selects the communications provider device 160 that was successful in the SMS message communication based on the record and transmits this to the transmission request unit 118. The transmission request unit 118 requests the selected communications provider device 160 to transmit the SMS message from the message output unit 116 to the communication terminal 170 of the designated telephone number using the SMS communication protocol. If the transmission of this SMS message has been successful, the record control unit 122 performs control of recording the communications provider device 160 and the SMS message communication protocol into the log 130 in association with the telephone number or an address associated with the telephone number.

The message transmission request is issued by the transmission request unit 118 until the message communication is successful or there are no more options for the combination of the communications provider device 160 and communication protocol.

(Modification 2) (Modification that Gives Priority to Specific Communications Provider Device 160)

For example, assumed is a case where it is possible to reduce the costs for communicating messages to the plurality of communication terminals 170 by using message communication with a specific communications provider device 160 as much as possible. As this example, there is a case where the specific communications provider device 160 manages the message communication device 100 as well, and the like. In this case, it means that the message communication device 100 and the specific communications provider device 160 are under the management of the same company. For this reason, it is desirable that the communications provider device selecting unit 112 selects with priority the communications provider device 160 under the management of the same company, which is cost-free. Note that in this case, whether or not message communication by the communications provider device 160 under the management of the same company is successful at each destination can be predicted. For example, telephone numbers or addresses associated with the telephone numbers to which a predetermined communications provider device 160 can transmit messages may be recorded in the log 130.

For the transmission of a message to a telephone number or an address associated with the telephone number to which the predetermined communications provider device 160 cannot transmit the message, the transmission request unit 118 conduct a message transmission request by exhaustively selecting combinations of the communications provider device 160 and communication protocol. The message transmission request is repeated until the transmission of the message is successful or there are no more combinations of the communications provider device 160 and communication protocol.

Note that even in the case where the message communication device 100 and the specific communications provider device 160 are not under the management of the same company, the communications provider device 160 that makes it possible to reduce the communication fee can be selected with priority by causing the same processing as described above.

<Hardware Configuration>

Figure 2:
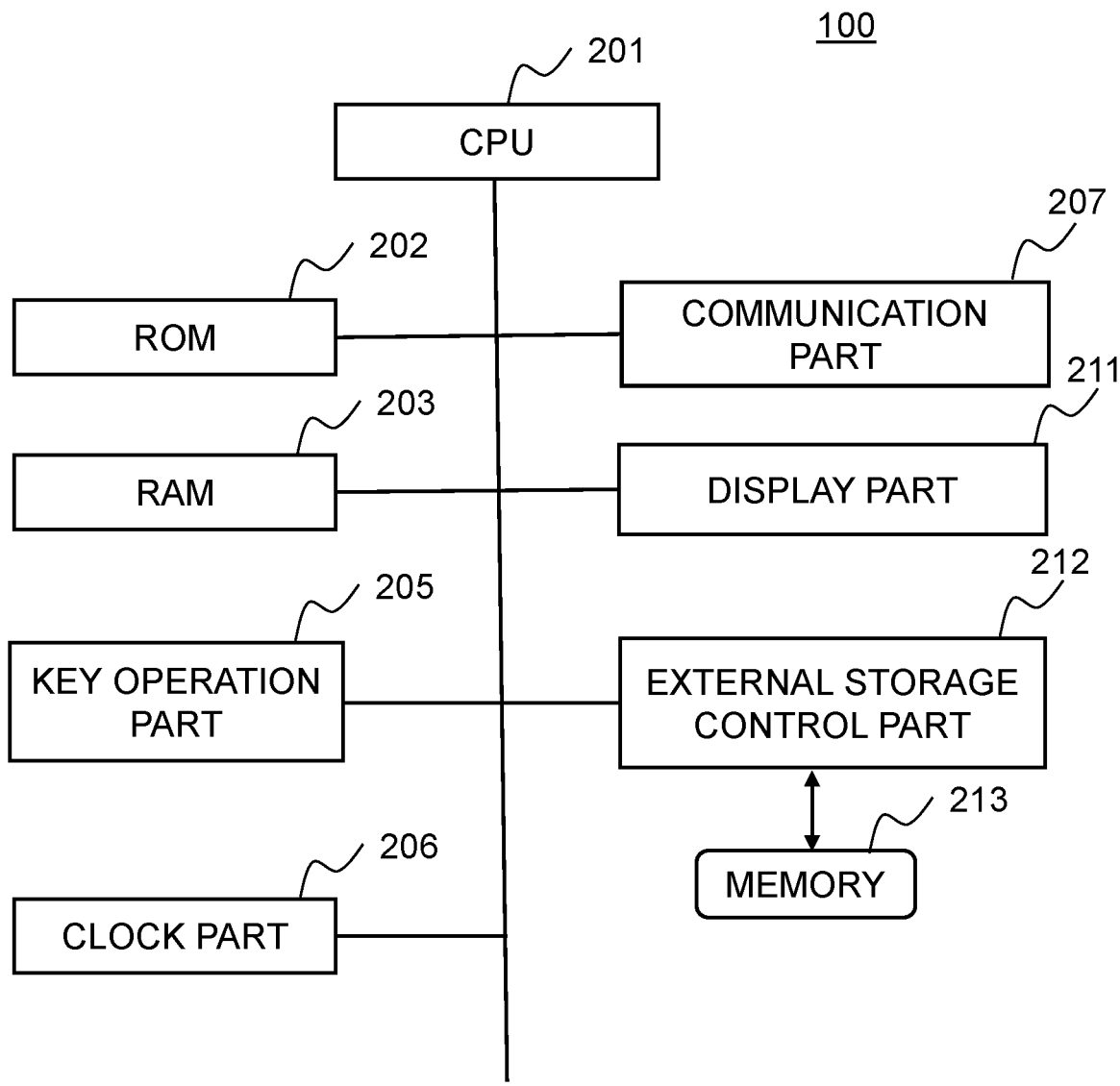
FIG. 2 is a hardware block diagram of a message communication device of the one embodiment.

FIG. 2 is a hardware configuration diagram of the message communication device 100. The message communication device 100 includes a CPU 201, a ROM 202, a RAM 203, a key operation part 205, a clock part 206, a communication part 207, a display part 211, and an external storage control part 212.

The message communication device 100 is capable of operating with the external storage control part 212 reading a program stored in the memory 213. The program may be stored also in the ROM 201 and the RAM 203. The message communication device 100 operates under the management of the CPU 201, which executes the program.

<Operation Flow>

Figure 3:
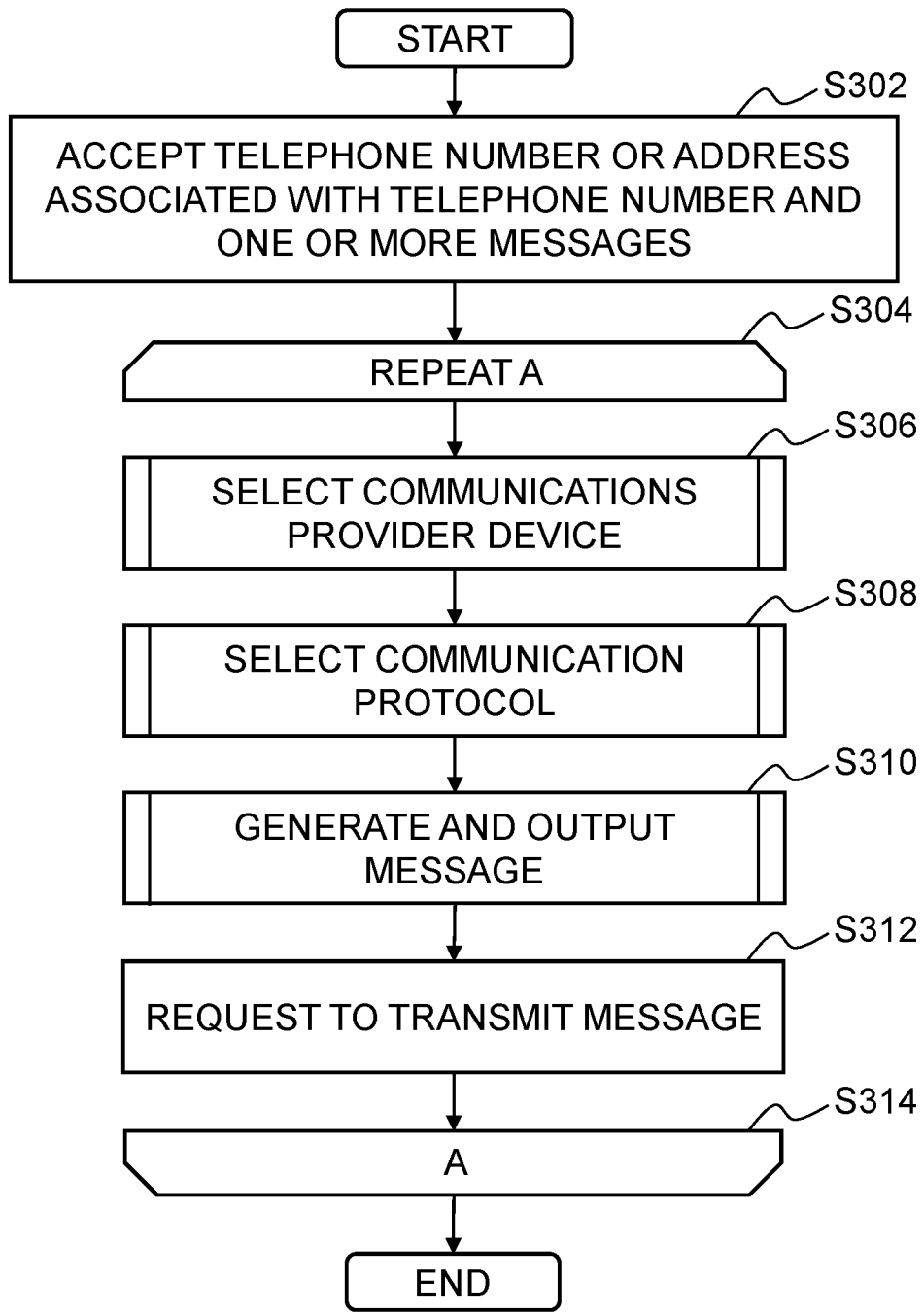
FIG. 3 is a flowchart illustrating brief summary of a process of the one embodiment.

FIG. 3 is a flowchart illustrating brief summary of processes of the one embodiment. Steps of the operation flow disclosed in the Specification and the drawings may be executed while being replaced in order as long as there is no contradiction. In addition, a plurality of steps may be executed simultaneously.

Each step may be achieved by executing a program stored in the memory. In addition, some of the steps may be achieved by the operating system or hardware.

In addition, the flows are not exclusive and may be combined as long as there is no contradiction.

In Step S302, a telephone number or an address associated with the telephone number and one or more messages are accepted from the client device 150. The one or more messages correspond to the respective message communication protocols.

Step S304 indicates that the process is exhaustively repeated for a specific telephone number or an address associated with the telephone number between Step S304 and Step 314.

In Step S306, the communications provider device 160 is selected.

In Step S308, the communication protocol is selected. The configuration of the message is specified by selecting the communication protocol.

Note that the order of Step S306 and Step S308 may be reversed. In addition, it is possible to first fix the selection of the communication protocol and then exhaustively conduct the selection of the communications provider device 160, or to first fix the selection of the communications provider device 160 and then exhaustively conduct the selection of the communication protocol. Moreover, in the case where there is hit as a result of searching the log 130 with a specific telephone number or an address associated with the telephone number, at least one of the communications provider device 160 and the communication protocol recorded in the entry thus hit may be selected with priority.

In Step S310, a message is generated and outputted. The configuration of the message depends on the selected communication protocol.

In Step S312, a transmission request is made to request the selected communications provider device 160 to transmit the message to the specific telephone number or an address associated with the telephone number using the selected protocol.

The processes are then ended.

Figure 4:
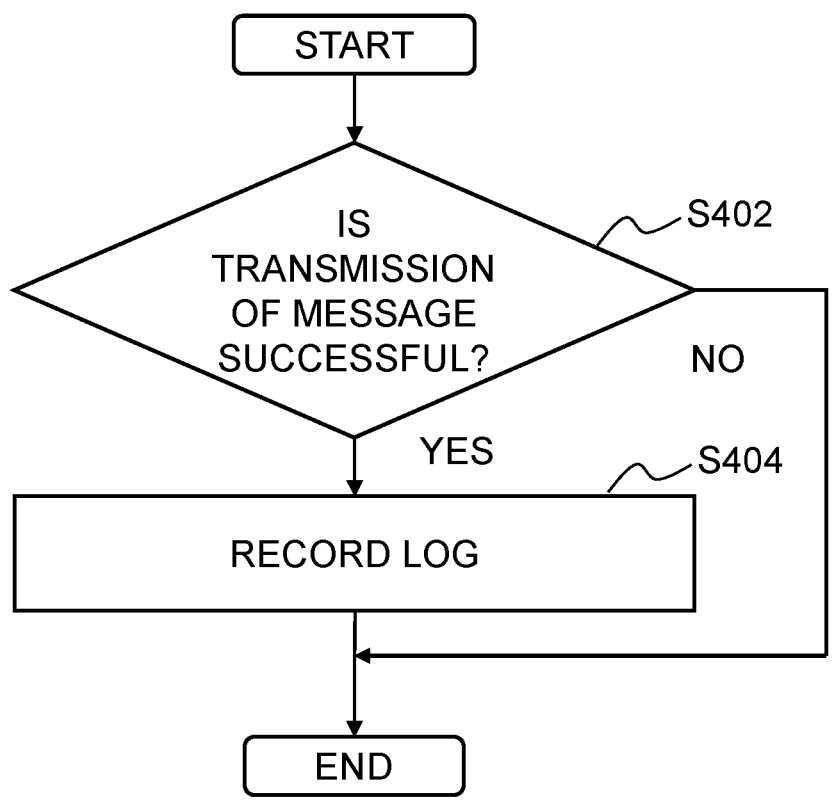
FIG. 4 is a flowchart illustrating details of a process of the one embodiment.

FIG. 4 is a flowchart illustrating details of a process of the one embodiment. This process may be executed after Step S312 of FIG. 3.

In Step S402, it is checked whether or not the transmission of a message is successful. If this check is YES, the process proceeds to Step S404. If this check is NO, the process may be ended. Note that in the case were the check is NO, if there is a corresponding entry in the log 130, the entry may be deleted, or the process of establishing a flag indicating that it is invalid, or the like may be performed.

In Step S404, the communications provider device 160 and the communication protocol when the transmission of the message was successful are at least recorded into the log 130 in association with the telephone number or an address associated with the telephone number. Note that one of the communications provider device 160 and the communication protocol when the transmission of the message was successful may be recorded in association with the telephone number or an address associated with the telephone number.

The processes are then ended.

Figure 5A:
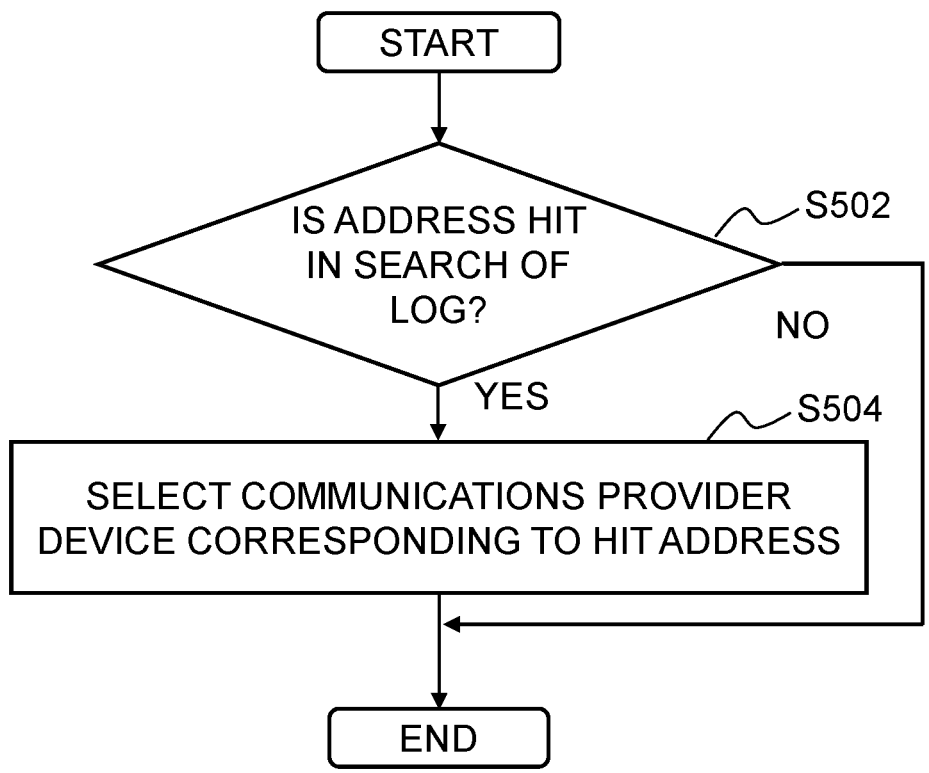
FIG. 5A and FIG. 5B are flowcharts illustrating details of processes of the one embodiment.
Figure 5B:
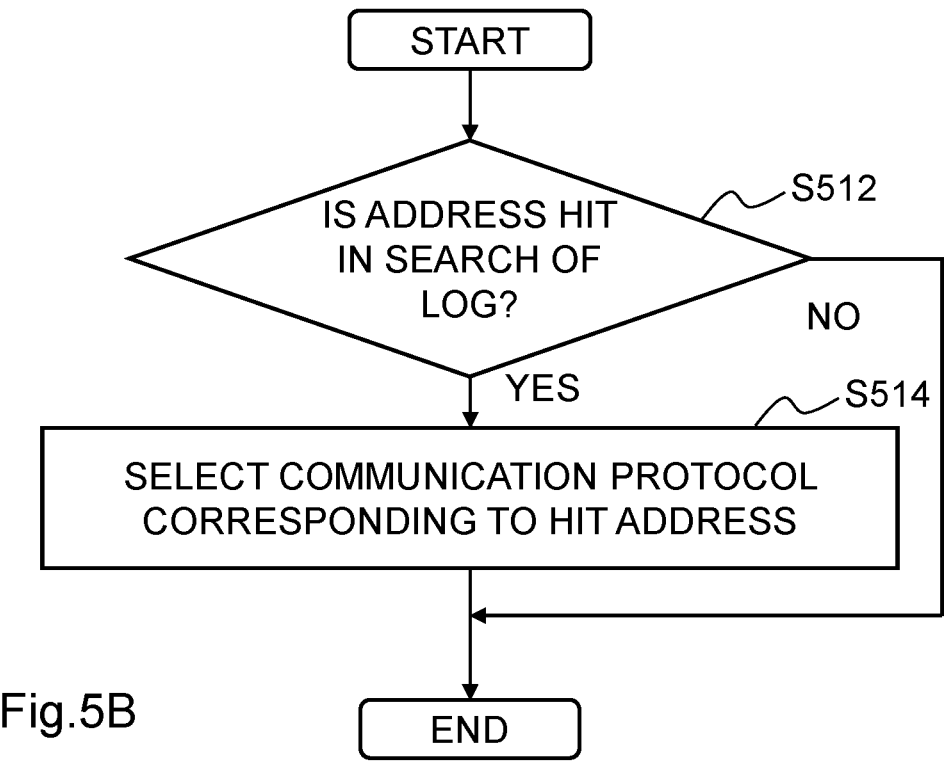

FIG. 5A and FIG. 5B are flowcharts illustrating details of processes of the one embodiment. FIG. 5A may be executed in Step S306 of FIG. 3. FIG. 5B may be executed in Step S308 of FIG. 3.

The process of FIG. 5A will be described below.

In Step S502 it is checked whether or not a telephone number or an address associated with the telephone number has been hit in the search of the log 130.

If this check is YES, the process proceeds to Step S504. If this check is NO, the process is ended.

In Step S504, the communications provider device 160 corresponding to the telephone number or an address associated with the telephone number that has been hit is selected. Note that as already mentioned, in the case where the order of selecting the specific communications provider device 160 is given priority, this process of Step S504 may be ignored and the communications provider device 160 may be selected based on the predetermined order of selecting.

The processes are then ended.

The process of FIG. 5B will be described below.

In Step S512, it is checked whether or not a telephone number or an address associated with the telephone number has been hit in the search of the log 130.

If this check is YES, the process proceeds to Step S514. If this check is No, the process is ended.

In Step S514, the communication protocol corresponding to the telephone number or an address associated with the telephone number that has been hit is selected. Note that as already mentioned, in the case where the order of selecting the specific communication protocol is given priority, this process of Step S514 may be ignored and the communication protocol may be selected based on the predetermined order of selecting.

The processes are then ended.

Figure 6A:
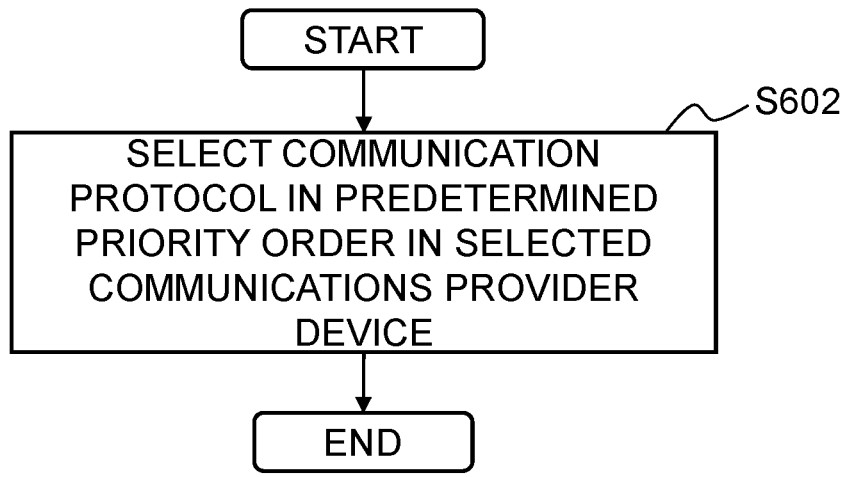
FIG. 6A and FIG. 6B are flowcharts illustrating details of processes of the one embodiment.
Figure 6B:
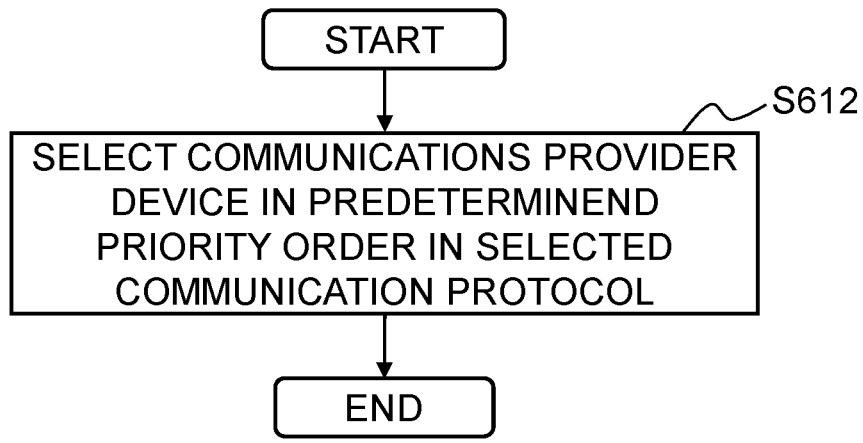

FIG. 6A and FIG. 6B are flowcharts illustrating details of processes of the one embodiment. FIG. 6A may be executed in Step S306 of FIG. 3. FIG. 6B may be executed in Step S308 of FIG. 3.

The process of FIG. 6A will be described below.

In Step S602, a communication protocol that is supported by the selected communications provider device 160 is selected in a predetermined priority order. Note that in the case where the telephone number or an address associated with the telephone number has been hit in the search of the log 130 and where the communications provider device 160 of the entry thus hit has been selected, the communication protocol of the entry may be selected.

The processes are then ended.

The process of FIG. 6B will be described below.

In Step S612, a communications provider device 160 that supports the selected communication protocol is selected in a predetermined priority order. Note that in the case where the telephone number or an address associated with the telephone number has been hit in the search of the log 130 and where the communication protocol of the entry thus hit has been selected, the communications provider device 160 of the entry may be selected.

The processes are then ended.

Figure 7:
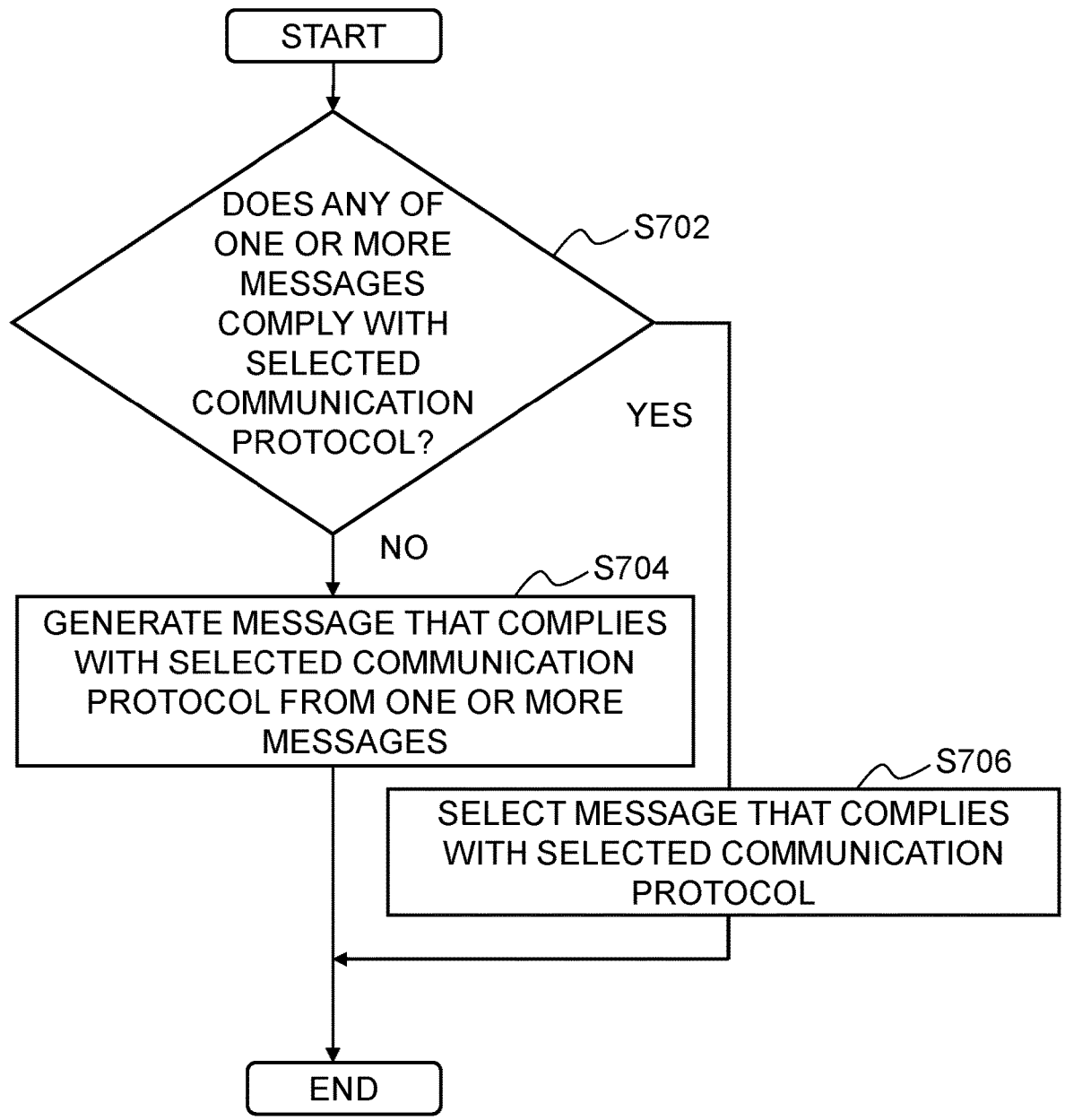
FIG. 7 is a flowchart illustrating details of a process of the one embodiment.

FIG. 7 is a flowchart illustrating details of a process of the one embodiment. This process may be executed in Step S310 of FIG. 3.

In Step S702, it is checked whether or not any of the one or more messages complies with the selected communication protocol. If this check is YES, the process proceeds to Step S706. If this check is NO, the process proceeds to Step S704.

In Step S704, a message that complies with the selected communication protocol is generated from the one or more messages. It is desirable that how this generation is performed is instructed by the client device 150 in advance.

In Step S706, a message that complies with the selected communication protocol is selected from among the one or more messages.

The processes are then ended.

<Other Modifications>

For example, in RCS, it is possible to find whether or not a transmitted message has been opened. For example, an opening rate obtained by averaging information on whether or not a message has been opened may be recorded in the log 130 by the record control unit 122. In the case where the log 130 was searched for a telephone number or an address associated with the telephone number, if a plurality of entries have been hit and an opening rate has been recorded in all the entries, the combination of the communications provider device 160 and the communication protocol corresponding to an entry having a high opening rate may be selected with priority. In this way, the opening rate of a message to be transmitted may be enhanced.

Each embodiment described above is not exclusive, and part of a certain embodiment may be incorporated into another embodiment, or part of a certain embodiment may be replaced with part of another embodiment.

In addition, each flow of the illustrated flowcharts may be replaced in order as long as there is no contradiction. Moreover, one of the illustrated flows may be executed a plurality of times at different timings as long as there is no contradiction.

In addition, a plurality of the flows may be executed simultaneously as long as there is no contradiction.

In addition, the program of part of the disclosed embodiments may be achieved with a general-purpose program such as an operating system or with hardware. Moreover, the disclosed program may be executed while distributed with a plurality of pieces of hardware.

The program for achieving the above-described embodiments may be executed by a computer having the hardware configuration illustrated in FIG. 2. In addition, the program of the embodiments may be implemented as a method to be executed by a computer. Part or all of the program of the embodiments may be executed by an operating system. In addition, part of the program may be achieved by hardware. The program may be stored in the memory 213, the ROM 202, or the RAM 203 of FIG. 2.

The embodiments may be implemented as a hardware device.

It goes without saying that the above-described embodiments do not limit the invention described in claims and are deemed as examples.

Regarding the above-described embodiments disclosed in the Specification, the following Appendices are described.

[Appendix 1]

A message communication device comprising:

an accepting unit that accepts at least an address and one or more messages to be transmitted to the address from a client, the address being a telephone number of a user of the client or an address associated with the telephone number, and the messages each possibly including a text;

a communications provider device selecting unit that selects one communications provider device from among a plurality of communications provider devices;

a communication protocol selecting unit that selects one communication protocol from among one or more communication protocols used in the selected communications provider device;

a message output unit that outputs a message that complies with the selected communication protocol and is to be transmitted to the address, from the one or more messages; and a transmission request unit that requests the selected communications provider device to transmit the message such that the message that has been outputted is transmitted to the address by the selected communications provider device using the selected communication protocol, the transmission request unit repeating the request until the transmission is successful or there are no more combinations of the communications provider device and the communication protocol.

[Appendix 2]

The message communication device according to Appendix 1, further comprising:

a determination unit that determines whether or not the transmission is successful; and a record control unit that controls recording of the communications provider device and the communication protocol as well as the address when the determination unit determines that the transmission is successful, into a log in association with one another, wherein in a case where the log is searched for the address and the address is hit, the communications provider device selecting unit selects the communications provider device corresponding to the hit address with priority, and/or in a case where the log is searched for the address and the address is hit, the communication protocol selecting unit selects the communication protocol corresponding to the hit address with priority.

[Appendix 3]

The message communication device according to Appendix 1 or 2, wherein the communications provider device selecting unit selects the communications provider device that is determined in advance with priority.

[Appendix 4]

The message communication device according to Appendix 1 or 2, wherein the communications protocol selecting unit selects the communication protocol that is determined in advance with priority.

[Appendix 5]

The message communication device according to any one of Appendices 1 to 4, wherein the message output unit outputs a message that complies with the selected communication protocol, based on the one or more messages accepted from the client.

[Appendix 6]

The message communication device according to Appendix 5, wherein in a case where none of the one or more messages accepted from the client comply with the selected communication protocol, the message output unit generates a message that complies with the communication protocol using the one or more messages.

[Appendix 7]

A non-transitory computer-readable medium storing a message communication program that, when executed by a computer, causes a computer to perform operations comprising:

accepting at least an address and one or more messages to be transmitted to the address from a client, the address being a telephone number of a user of the client or an address associated with the telephone number, and the messages each possibly including a text;

selecting one communications provider device from among a plurality of communications provider devices;

selecting one communication protocol from among one or more communication protocols used in the selected communications provider device;

outputting a message that complies with the selected communication protocol and is to be transmitted to the address, from the one or more messages; and requesting the selected communications provider device to transmit the message such that the message that has been outputted is transmitted to the address by the selected communications provider device using the selected communication protocol, the request being repeated until the transmission is successful or there are no more combinations of the communications provider device and the communication protocol.

[Appendix 8]

A message communication device comprising:

an accepting unit that accepts at least an address and one or more messages to be transmitted to the address from a client, the address being a telephone number of a user of the client or an address associated with the telephone number, the message each possibly including a text;

a communications provider device selecting unit that selects one communications provider device from among a plurality of communications provider devices;

a communication protocol selecting unit that selects one communication protocol from among a plurality of communication protocols used in the plurality of communications provider devices;

a message output unit that outputs a message that complies with the selected communication protocol and is to be transmitted to the address, from the one or more messages;

a transmission request unit that requests the selected communications provider device to transmit the message such that the message that has been outputted is transmitted to the address by the selected communications provider device using the selected communication protocol;

a determination unit that determines whether or not the transmission is successful; and a record control unit that controls recording of the communications provider device and the communication protocol as well as the address when the determination unit determines that the transmission is successful, into a log in association with one another, wherein in a case where the log is searched for the address and the address is hit, the communications provider device selecting unit selects the communications provider device corresponding to the hit address with priority, and the communication protocol selecting unit selects the communication protocol corresponding to the hit address with priority.

[Appendix 9]

A non-transitory computer-readable medium storing a message communication program that, when executed by a computer, causes the computer to perform operations comprising:

accepting at least an address and one or more messages to be transmitted to the address from a client, the address being a telephone number of a user of the client or an address associated with the telephone number, the message each possibly including a text;

selecting one communications provider device from among a plurality of communications provider devices;

selecting one communication protocol from among a plurality of communication protocols used in the plurality of communications provider devices;

outputting a message that complies with the selected communication protocol and is to be transmitted to the address, from the one or more messages;

requesting the selected communications provider device to transmit the message such that the message that has been outputted is transmitted to the address by the selected communications provider device using the selected communication protocol;

determining whether or not the transmission is successful; and controlling recording of the communications provider device and the communication protocol as well as the address when the determining determines that the transmission is successful, into a log in association with one another, wherein in a case where the log is searched for the address and the address is hit, the selecting the communications provider device selects the communications provider device corresponding to the hit address with priority, and the selecting the communication protocol selects the communication protocol corresponding to the hit address with priority.

REFERENCE SIGNS LIST 100 message communication device
110 accepting unit
112 communications provider device selecting unit
114 communication protocol selecting unit
116 message output unit
118 transmission request unit
122 record control unit
124 determination unit
130 log
142 chatbot
150 client device
152 chatbot
160 communications provider device
170 communication terminal
180 reception unit

The invention claimed is:

1. A message communication device comprising:
a memory that stores program instructions; and
a processor that is configured to execute the program instructions stored in the memory to:
accept at least an address and one or more messages to be transmitted to the address from a client, the address being a telephone number of a user of the client or an address associated with the telephone number, and the messages each possibly including a text;
select one communications provider device from among a plurality of communications provider devices;
select one communication protocol from among a plurality of communication protocols used in the plurality of communications provider devices;
output a message that complies with the selected communication protocol and is to be transmitted to the address, from the one or more messages;
request the selected communications provider device to transmit the message such that the message that has been outputted is transmitted to the address by the selected communications provider device using the selected communication protocol, and repeat the request until the transmission is successful or there are no more combinations of the communications provider device and the communication protocol;
determine whether or not the transmission is successful; and
control recording of the communications provider device and the communication protocol as well as the address when the processor determines that the transmission is successful, into a log in association with one another, wherein a case where the log is searched for the address and the address is hit, the processor selects the communication protocol corresponding to the hit address with priority.

2. The message communication device according to claim 1,
wherein
in a case where the log is searched for the address and the address is hit, the processor selects the communications provider device corresponding to the hit address with priority.

3. The message communication device according to claim 1, wherein the processor is configured to execute the program instructions stored in the memory to:
select the communication protocol that is determined in advance with more priority.

4. The message communication device according to claim 1, wherein the processor is configured to execute the program instructions stored in the memory to:
output a message that complies with the selected communication protocol, based on the one or more messages accepted from the client.

5. The message communication device according to claim 4, wherein the processor is configured to execute the program instructions stored in the memory to:
in a case where none of the one or more messages accepted from the client comply with the selected communication protocol, generate a message that complies with the communication protocol using the one or more messages.

6. A message communication device comprising:
a memory that stores program instructions; and
a processor that is configured to execute the program instructions stored in the memory to:
accept at least an address and one or more messages to be transmitted to the address from a client, the address being a telephone number of a user of the client or an address associated with the telephone number, and the messages each possibly including a text;
select one communications provider device from among a plurality of communications provider devices;
select one communication protocol from among a plurality of communication protocols used in the plurality of communications provider devices;
output a message that complies with the selected communication protocol and is to be transmitted to the address, from the one or more messages;
request the selected communications provider device to transmit the message such that the message that has been outputted is transmitted to the address by the selected communications provider device using the selected communication protocol, and repeat the request until the transmission is successful or there are no more combinations of the communications provider device and the communication protocol;
determine whether or not the transmission is successful; and
control recording of the communications provider device and the communication protocol as well as the address when the determination unit processor determines that the transmission is successful, into a log in association with one another, wherein in a case where the log is searched for the address and the address is hit, the processor selects the communications provider device corresponding to the hit address with priority.

7. The message communication device according to claim 3, wherein the processor is configured to execute the program instructions stored in the memory to:
select the communications provider device that is determined in advance with more priority.

8. A non-transitory computer-readable medium storing a message communication program that, when executed by a computer, causes the computer to perform operations comprising:
accepting at least an address and one or more messages to be transmitted to the address from a client, the address being a telephone number of a user of the client or an address associated with the telephone number, the message each possibly including a text;
selecting one communications provider device from among a plurality of communications provider devices;
selecting one communication protocol from among a plurality of communication protocols used in the plurality of communications provider devices;
outputting a message that complies with the selected communication protocol and is to be transmitted to the address, from the one or more messages; and
requesting the selected communications provider device to transmit the message such that the message that has been outputted is transmitted to the address by the selected communications provider device using the selected communication protocol, the request being repeated until the transmission is successful or there are no more combinations of the communications provider device and the communication protocol;
determine whether or not the transmission is successful; and
control recording of the communications provider device and the communication protocol as well as the address when the processor determines that the transmission is successful, into a log in association with one another, wherein
a case where the log is searched for the address and the address is hit, the processor selects at least one of the communication protocol corresponding to the hit address with priority and the communications provider device corresponding to the hit address with priority.

9. A message communication device comprising:
a memory that stores program instructions; and
a processor that is configured to execute the program instructions stored in the memory to:
accept at least an address and one or more messages to be transmitted to the address from a client, the address being a telephone number of a user of the client or an address associated with the telephone number, and the messages each possibly including a text;
select one communications provider device from among a plurality of communications provider devices;
select one communication protocol from among a plurality of communication protocols used in the plurality of communications provider devices;
output a message that complies with the selected communication protocol and is to be transmitted to the address, from the one or more messages;
request the selected communications provider device to transmit the message such that the message that has been outputted is transmitted to the address by the selected communications provider device using the selected communication protocol;

determine whether or not the transmission is successful; and control recording of the communications provider device and the communication protocol as well as the address when the determination unit processor determines that the transmission is successful, into a log in association with one another, wherein in a case where the log is searched for the address and the address is hit, the processor selects the communications provider device corresponding to the hit address with priority, and the processor selects the communication protocol corresponding to the hit address with priority.

10. A non-transitory computer-readable medium storing a message communication program that, when executed by a computer, causes the computer perform operations comprising:

accepting at least an address and one or more messages to be transmitted to the address from a client, the address being a telephone number of a user of the client or an address associated with the telephone number, and the messages each possibly including a text;

selecting one communications provider device from among a plurality of communications provider devices;

selecting one communication protocol from among a plurality of communication protocols used in the plurality of communications provider devices;

outputting a message that complies with the selected communication protocol and is to be transmitted to the address, from the one or more messages;

requesting the selected communications provider device to transmit the message such that the message that has been outputted is transmitted to the address by the selected communications provider device using the selected communication protocol;

determining whether or not the transmission is successful; and controlling recording of the communications provider device and the communication protocol as well as the address when the determining step determines that the transmission is successful, into a log in association with one another, wherein in a case where the log is searched for the address and the address is hit, the step of selecting the communications provider device selects the communications provider device corresponding to the hit address with priority, and the step of selecting the communication protocol selects the communication protocol corresponding to the hit address with priority.

* * * * *